United States Patent [19]
Uffner

[11] 3,988,290
[45] Oct. 26, 1976

[54] COBALTIC PROMOTERS IN UNSATURATED POLYESTER RESIN SHEET MOLDING AND BULK MOLDING COMPOUND

[75] Inventor: Melville W. Uffner, Glen Mills, Pa.

[73] Assignee: Air Products and Chemicals, Inc., Allentown, Pa.

[22] Filed: Apr. 30, 1975

[21] Appl. No.: 572,957

[52] U.S. Cl. .............................. 260/40 R; 260/863; 260/873
[51] Int. Cl.[2] ..................... C08L 67/00; C08L 67/06
[58] Field of Search ................ 260/863, 45.95, 873, 260/40 R

[56] References Cited
UNITED STATES PATENTS

| | | | |
|---|---|---|---|
| 3,631,217 | 12/1971 | Rabenold | 260/863 |
| 3,649,711 | 3/1972 | Payne, Jr. | 260/863 |
| 3,794,695 | 2/1974 | Burkhardt et al. | 260/863 |
| 3,804,799 | 4/1974 | Uffner | 260/40 R |

*Primary Examiner*—J. Ziegler
*Attorney, Agent, or Firm*—Russell L. Brewer; Barry Moyerman

[57] ABSTRACT

This invention relates to an improvement in a process for preparing unsaturated polyester resins which are chemically thickened with a Group II metal oxide or hydroxide and the resulting product. The improvement for extending the shelf life of said molding compound while providing for enhanced curing rates at the molding temperature comprises:

incorporating at least an effective proportion of a cobaltic promotor in said molding compound for selectively extending the shelf life of said molding compound and for providing enhanced cure rate.

24 Claims, No Drawings

COBALTIC PROMOTERS IN UNSATURATED POLYESTER RESIN SHEET MOLDING AND BULK MOLDING COMPOUND

BACKGROUND OF THE INVENTION

Although the use of unsaturated polyester molding compounds have been known and widely used in the industry for several decades, the origin of sheet molding compound (SMC) and bulk molding compound (BMC), which is an unsaturated polyester resin thickened, generally chemically, has a more recent beginning. Credit seems to be given to Vincent Frilette in U.S. Pat. No. 2,568,331 and Charles F. Fisk, in U.S. Pat. No. 2,628,209 for the development of chemical thickeners that would permit the manufacture of reinforced and unreinforced molding compositions comprising an unsaturated polyester resin and a vinyl monomer which could be mixed, handled, and stored prior to molding. This development gave wide latitude to compounders and molders of unsaturated polyester resin. It now became possible to compound large batches of a molding composition and store it in a form such as in sheet or in bulk for use at a later time. Prior to this development it was difficult to obtain tack free compounds and to avoid resin rich molding. Resin rich molding occurs with non-thickened compounds in that the polyester resin separates from the glass.

In the manufacture of sheet molding compound or bulk molding compound, the chemical thickener, promotor, catalyst, reinforcing agent, fillers, and lubricants are blended with the unsaturated polyester resin component and the unsaturated or vinyl monomer component and formed as a sheet and subsequently wound on a reel or formed as pellets or sausages in bulk.

It is an objective in SMC and BMC manufacture to find promotors and catalysts which can be blended in the molding composition at the time of compounding that will remain substantially inactive at temperatures below the molding temperature to give suitable "shelf life" to the molding compound and yet be sufficiently reactive for catalyzing or promoting the curing of the molding compound at the molding temperature. Many of the so called catalysts or promotors for curing unsaturated polyester resin are unsuited for the manufacture of sheet molding compound or bulk molding compound because they are so reactive that they cause gelation prior to molding.

DESCRIPTION OF THE PRIOR ART

A number of patents report the use of organometallics in promoting the cure rate of unsaturated polyester resin. Typical organometallics include soluble salts or reactive metals such as manganese octanoate, cobalt naphthenate, cobalt decanoate, lithium octanoate, lithium thiocyanate, aluminum laurate, aluminum octoate and gallium octoate. These salts, however, are too reactive and result in SMC and BMC having a short shelf life.

It has been proposed to combine organometallic and cobalt salts of the type described above with peresters, peroxides, and hydroperoxides, to catalyze the cure of unsaturated polyester resins. Examples of peroxides and peresters as well as hydroperoxides suited for combination with the cobalt salts include methylethylketone peroxide, tertiary butyl perbenzoate, cumene hydroperoxide, tertiary butyl hydroperoxide, tertiary butyl perlaurate, and so forth.

Enolizable ketones such as 2,4-pentanedione and organometallic or cobalt salts of beta-diketones have also been used to enhance the cure of unsaturated polyester resins. Cobalt acetyl acetonate for example has been used to enhance the cure rate of unsaturated polyester resin.

Cobalt salts have been combined with chelating agents e.g., ethylenediaminetetracetic acid, optionally with a peroxide catalyst or with triethylenediamine to facilitate the cure of unsaturated polyester resin.

Generally, the organometallic promoters employed for the manufacture of polyester resin are not suited for initiated SMC or BMC because they result in poor shelf life. Gelation may occur within a matter of a few days or less at storage temperatures of 75° F. This is the reason that high temperature peroxide and hydroperoxide catalysts primarily have been used to catalyze the reaction and organometallics excluded.

SUMMARY OF THE INVENTION

It has been found that the shelf life of a molding compound comprising an unsaturated polyester resin and an unsaturated monomer, soluble and copolymerizable therewith, and chemically thickened with a Group II metal oxide or hydroxide can be extended while at the same time have enhanced cure rate at the molding temperature by incorporating a cobaltic promotor into the molding compound in at least an effective proportion for selectively extending the shelf life of the molding compound and enhancing the cure rate.

Advantages of this invention include:

sheet molding compound (SMC) and bulk molding compound (BMC) chemically thickened with a Group II metal oxide or hydroxide having a 100° F shelf life of from 18 to 20 days and sometimes longer as compared to SMC and BMC shelf lives of from 3 to 13 days by employing prior art techniques;

a sheet molding compound or bulk molding compound which has a kick off temperature sufficiently high e.g., 200° to 250° F so that gelation will be minimized when the resin is placed in the mold; and molding compounds which are not adversely discolored by the catalyst systems employed.

DESCRIPTION OF THE PREFERRED EMBODIMENT

In manufacturing a molding compound referred to as sheet molding compound or bulk molding compound, it is necessary to synthesize a thermosettable polyester resin which is a product of an esterification reaction between at least one unsaturated polycarboxylic acid (or anhydride thereof) and at least one polyhydric alcohol. Typical polycarboxylic acids include maleic, fumaric, mesaconic, citraconic and glutaconic acids. Such saturated polycarboxylic acid can be included e.g., up to 40% where desired. These include phthalic (iso and ortho), succinic, adipic and sebacic acid. Typical polyhydric alcohols include glycols such as diethylene glycol, trimethylene glycol, propylene glycol, ethylene glycol; and trimethylol propane and their alkoxylated counterparts.

An unsaturated monomer is combined with the unsaturated polyester resin in order to permit cross-linking with the unsaturated polyester component to form a thermoset polyester resin. In the copolymerization between the unsaturated monomer and unsaturated polyester resin, curing is effected whereby the resin converts from the liquid to solid form and becomes substantially crosslinked and infusible. Unsaturated monomers crosslinkable with the unsaturated polyester resin should be substantially soluble in the unsaturated polyester resin to permit uniform dispersion. Examples of unsaturated monomers suited for crosslinking thermosetable polyester resins include vinyl monomers e.g., styrene, butadiene, methylstyrene, methylmethacrylate, ethylacrylate, vinyl acetate, vinyl toluene, and allyl monomers e.g., allyl acetate, and allyl alcohol.

A chemical thickener is added to the thermosettable polyester resin including the unsaturated monomer to permit thickening of the resin composition for subsequent handling. As mentioned earlier, the use of chemical thickeners for increasing the viscosity of unsaturated polyester resins and unsaturated monomer is known. Generally, the chemical thickeners are the Group II metal oxide and hydroxides. Particularly effective are magnesium oxide and hydroxide and calcium oxide and hydroxide. However, barium oxide, barium hydroxide and zinc oxide can be used for practicing this invention. For reasons of efficiency and economy, magnesium and calcium oxide or hydroxide are the preferred chemical thickeners and they may be used singly or in combination with each other. These thickeners are employed in conventional amounts e.g., from 0.5–25 parts per 100 parts resin and generally from 1–5 parts per 100 parts.

Cobaltic promotors apparently have a synergistic reaction with the chemical thickeners as they provide for an extended shelf life at moderately low temperatures, e.g., room temperature to 100° F and yet have sufficient reactivity at molding temperatures of about 300° F to provide desired peak exotherm temperatures and to provide for an accelerated cure rate. Although both forms of the cobalt promotors have been used in curing neat polyester resins, the cobaltous form does not provide for the extended shelf life in SMC and BMC that is obtained by the use of the cobaltic form. Cobaltous promotors in SMC and BMC are too reactive at low temperatures and are not deactivated by the chemical thickeners as are the cobaltic promoters. Examples of cobaltic promoters suited for practicing this invention are cobalt salts of monocarbocylic acids having from 2–20 carbon atoms (sometimes referred to as cobaltic soaps) e.g., cobaltic acetate, cobaltic decanoate, cobaltic neodecanoate, cobaltic octanoate, and cobaltic napthenate; cobaltic salts of beta diketones e.g., cobaltic acetyl acetonate, and cobaltic acetonylacetonate; and dispersible inorganic cobaltic salts such as cobaltic fluoride, cobaltic hydroxide, cobaltic oxide, cobaltic chloride, cobaltic sulfate, and the like. The preferred cobaltic promoters are the organo promoters, or those inorganic promoters which are highly soluble in the polyester resin syrup. This permits uniform dispersion of the promoter throughout the molding compound and reduces the possibility for localized cold spots or localized areas which may pre-gel prior to molding.

The cobaltic promoter should be added in its valence III state to the polyester resin and unsaturated monomer and mixed therein prior to forming the sheet or bulk molding compound. If the cobalt is added in its valence II state, then the shelf life of the molding compound is shortened substantially and the kick-off temperature is substantially lower than that for the cobaltic form and may result in gelation prior to molding at the time the molding compound is placed in the mold. Even though the cobaltous form may be oxidized to valence III state to form the cobaltic ion by a peroxy catalyst, it cannot be added to the resin during manufacture. The fact that the cobaltous form was initially employed diminishes the shelf life and lowers the kick-off temperature.

In practicing the invention, at least an effective proportion of the cobaltic promotor is added for selectively extending the shelf life of the molding compound while at the same time selectively providing for enhanced cure rate. Generally, from 0.006 to 0.036 parts (by weight) cobaltic metal per 100 parts (by weight) of polyester resin including unsaturated monomer is employed. Preferably from 0.0075 to 0.03 parts cobaltic metal per 100 parts polyester resin including unsaturated monomer is employed. When less than about 0.006 parts cobaltic metal is employed, then the shelf life is somewhat reduced. Likewise, the cure rate is slightly less than would be obtained if greater quantities of cobaltic metals are used. Good results are obtained in the preferred range and particularly when levels of about 0.01 to 0.03 parts cobaltic metal per 100 parts polyester resin are employed. When quantities greater than 0.036 parts cobaltic metal are employed, the shelf life of the molding compound is reduced and the kick-off temperature may be reduced thereby causing some gelation prior to molding. It is also possible that increased level of cobaltic salts may in fact retard the cure rate of the polyester at the molding temperature and thus reduce its effectiveness. Additionally, the increased quantity of cobaltic promotor employed tends to increase the overall cost of the molding compound without achieving significant advantages.

Generally, a perester, a peroxide or a hydroperoxide catalyst, in a proportion of from 0.25–2 parts by weight of the unsaturated polyester and unsaturated monomer commonly used in catalyzing polyester curing is used in combination with the cobaltic promoter to give a faster cure. The catalysts should be selected with care because some of the catalysts are less stable and more reactive than others and thereby tend to shorten the shelf life of the SMC or BMC. For example, a blend of methylethyl ketone peroxide and cobaltic acetyl acetonate will have a shorter shelf life than the more stable cumene hydroperoxide and cobaltic promoter. However, the shelf life of the molding compound with either component will be extended by the fact the cobaltic ion is present as compared to molding compound employing no organo-metallic promoter or another type of organometallic promoter. Examples of perester, peroxy and hydroperoxy catalysts which can be used in practicing the invention include t-butyperbenzoate, t-butylperoctoate, 2,5-dimethyl-2, 5-bis - (2-ethylhexanoyl peroxy) - hexane, cumene hydroperoxide, diisopropropylhydroperoxide 1,1,1,3,3-tetra methyl butyl hydroperoxide and methyl ethyl ketone peroxide.

As is known, various components can be added in the manufacture of SMC and BMC for their desired effects. Siccative oils can be added to the polyester composition for the manufacture of alkyd type sheet and bulk molding compound. Examples of siccative oils suited for this use are oiticicia, tung, linseed, soya bean, and castor. Fillers e.g., calcium carbonate, clay, asbestos, and aluminum hydrate; lubricants such as zinc stearate, calcium stearate, polyethylene; and pigments e.g., titanium dioxide, ferric oxide, litharge, zinc oxide, zinc sulfide, and the like can be employed for their desired purpose. Quite often it is advantageous to prepare reinforced polyesters and this typically is accomplished by incorporating glass fibers having a length of about ¼ to 2 inches into the molding compound.

In more recent times, it has been customary to add a low shrink or low profile component to the molding compound to prevent shrinkage during molding. Absent a low shrink or low profile component it is difficult to obtain great precision in preparing molded parts or the surface may have waves or ribs. Generally, a low shrink or low profile component is a thermoplastic (which may have some unsaturation) dissolved in vinyl monomer, and it is exuded from the mixture of polyester resin and vinyl monomer as a discontinuous phase during cure, thus filling the void left by the shrinking of the polyester resin. Typical low shrink additives include thermoplastics such as polyacrylates, e.g., polymethylmethacrylate, polyvinylchloride, polyethylene, polyvinylacetate, and so forth. Those conventionally used in the practice of making low profile or low shrink resins can be used here.

The following examples are provided to illustrate preferred embodiments of the invention and are not intended to restrict the scope thereof. All parts or parts by weight and all percentages are expressed as weight percentages unless otherwise specified.

EXAMPLE I

A typical composition suited for making bulk and sheet molding compound comprises;

| MATERIALS | | PARTS |
|---|---|---|
| 60 parts unsaturated polyester resin in styrene; | | 25 to 30 |
| 40 parts thermoplastic resin in styrene | | |
| Calcium carbonate filler | Parts by weight | 40 to 55 |
| Lubricant (zinc stearate) | Parts by weight | 1 to 2 |
| Thickener, magnesium hydroxide or magnesium oxide | Parts per 100 parts resin (PHR) | 2 to 3 |
| Catalyst (t-butylperbenzoate) | PHR | 0.8 to 1.2 |
| Glass Reinforcement | | 10 to 30 |

These materials are blended in a heavy duty kneader or dispersion to effect thorough homogeneity. The blended charge or premix is matured for several days and cut to convenient size, molded and cured at temperatures ranging from about 250° to 325° F for a short time, e.g., 1 to 3 minutes.

The performance characteristics of the resin were determined by following the above procedure for formulating the resin except for varying the type of metallic promotor used for accelerating the reaction. Fillers, lubricant, thickeners, and glass reinforcement were omitted from the neat resin.

Tests conducted for determining performance were gel time, rate of cure, kick-off temperature and peak exotherm by the standard Block Test Method using the SPI procedure for running exotherm curves as set forth in the preprint for the 24th Annual Technical Conference, 1969; Reinforced Plastics/Composites Division; The Society of Plastics Industry.

Shelf life stability under accelerated conditions, was determined by storing 300 gram charges of each of the compositions (pastes) less fiberglass in capped cans at 100° F immediately after compounding. The contents of each can were checked daily for penetrability by a screw driver. When the tip of the screwdriver blade could no longer be pushed to the bottom, the paste was considered no longer moldable on the press and its shelf life was considered terminated.

The resins used for formulating the molding compositions were Paraplex P-340, which is a styrene solution of a highly reactive polyester made from glycols (7.3 moles propylene to 0.7 ethylene with cis and trans-butenedioic acid (commonly referred to as fumaric and maleic acid), the polyester being present in a proportion of from about 65 to 70 parts by weight and the styrene being present in a proportion of from 35 to 30 parts by weight and Paraplex 701 which is a low shrink component comprising a thermoplastic acrylate in styrene. Both Paraplex P-340 and Paraplex P-701 are trademarks of Rohm and Haas Co. and the combination of P-340 and P-701 is sold together as Paraplex P-19D. The proportions of the resinous component, the catalyst, and cobaltic promoter along with a gel, time, peak exotherm temperature and kick-off temperature are shown in Table I.

TABLE I

SPI BLOCK EXOTHERM DATA AT 300° F

EFFECT OF $Co^{+3}$ ACETYLACETONATE AND OTHER METAL PROMOTERS ON THE GEL TIME, CURE TIME, PEAK EXOTHERM, AND KICK-OFF TEMPERATURE

| | 1 | 2 | 3 | 4 | 5 | 6 | 7 | 8 | 9 | 10 | 11 |
|---|---|---|---|---|---|---|---|---|---|---|---|
| Paraplex P-340 | 60 | 60 | 60 | 60 | 60 | 60 | 60 | 60 | 60 | 60 | 60 |
| Paraplex P-701 | 40 | 40 | 40 | 40 | 40 | 40 | 40 | 40 | 40 | 40 | 40 |
| T-Butyl perbenzoate | | 1 | 1 | 1 | 1 | 1 | 1 | 1 | | | |
| Co $Cl_2 \cdot 6H_2O$ | | | * | | | | | | | | |
| Cobaltous Naphthanate | | | | * | | | | | | | |
| Triethylene diamine and CoCl/2·$6H_2O$ | | | | | * | | | | | | * |
| Cobaltous acetylacetonate | | | | | | * | | * | | * | |
| Cobaltic acetylacetonate | | | | | | | * | | 0.3 | | 0.3 |
| Acetylacetone | | | | | | | | | | | |
| Gel time, min. | 13 | 1.1 | 0.1 | 0.2 | 0.6 | 0.2 | 0.4 | 1 | 10 | 4 | 0.2 |
| Cure time, min. | 21 | 1.4 | 0.4 | 0.5 | 0.9 | 0.5 | 0.7 | 1.3 | 15 | 5 | 0.4 |
| Peak exotherm ° F | 405 | 443 | 427 | 462 | 445 | 458 | 478 | 462 | 355 | 347 | 400 |
| Kick-off temp., ° F | 315 | 230 | 90 | 170 | 235 | 150 | 225 | 225 | 310 | 305 | 145 |

*0.012 Active metal added

The results in Table I show that in a neat polyester resin the cobaltic promoted t-butyl perbenzoate catalyzed resin (Sample 7) cures in roughly one-half the time that the nonpromoted resin cures (Sample 2) but has about the same kick-off temperature for preventing pre-gelation in the mold. Although the other organo promoters in Samples 3, 4, and 6 were effective for enhancing the cure rate, the kick-off temperatures are so low that the resins would gel when placed in the mold.

The results also show that the cobaltic ion is effective for enhancing cure in a noncatalyzed system as for example Sample 10 shows a cure time of about ¼ of Sample 1 and it is more effective than an acetyl acetone promoted resin (see Sample 8).

EXAMPLE II

A composition suited for making sheet and bulk molding compound is prepared in accordance with Example I except for the following variations in the formula as reported in Table II below. These compositions were tested for shelf life at 100° F, which is an accelerated testing of shelf life as to the normal shelf life testing of 73° F, and some were tested for their cure data based on a step down compression mold from ¼ to ⅛ inch at 300° F.

TABLE II

ACCELERATED AGING OF SMC PASTES
EFFECT OF COBALTIC ACETYL ACETONATE/GROUP II METAL (HYDR) OXIDE COMBINATION EFFECT ON SHELF-LIFE OF PASTE AT 100° F

|  | 1 | 2 | 3 | 4 | 5 | 6 | 7 | 8 | 9 | 10 |
|---|---|---|---|---|---|---|---|---|---|---|
| Paraplex P-340 | 60 | 60 | 60 | 60 | 60 | 60 | 60 | 60 | 60 | 60 |
| Paraplex P-701 | 40 | 40 | 40 | 40 | 40 | 40 | 40 | 40 | 40 | 40 |
| t-Butyl perbenzoate | 1 | 1 | 1 | 1 | 1 | 1 | 1 | 1 | 1 | 1 |
| Co Cl$_2$·6H$_2$O |  | * |  |  |  |  |  |  |  |  |
| Cobaltous naphthanate |  |  | * |  |  |  | * |  |  |  |
| Triethylene diamine and Co Cl$_2$·6H$_2$O |  |  |  | * |  |  |  |  |  |  |
| Cobaltous acetylacetonate |  |  |  |  | * |  |  |  |  |  |
| Cobaltic acetylacetonate |  |  |  |  |  | * |  | * | * |  |
| Acetylacetone |  |  |  |  |  |  | 0.3 |  |  |  |
| Zinc Stearate | .5 | 5 | 5 | 5 | 5 | 5 | 5 | 5 | 5 | 5 |
| Ca CO$_3$ | 150 | .150 | 150 | 150 | 150 | 150 | 150 | 150 | 150 | 150 |
| Mg (OH)$_2$ | 2.5 | 2.5 | 2.5 | 2.5 | 2.5 | 2.5 | 2.5 |  |  |  |
| Mg O |  |  |  |  |  |  |  |  | 1.25 |  |
| Cure data from ¼" - ⅛" step-down compression MOLD at 300° F ** |  |  |  |  |  |  |  |  |  |  |
| Minimum cure time, min. |  | 1.75 |  | 1.25 |  | 1.25 |  |  |  |  |
| Under cure, min. |  | 1.25 |  | 1.00 |  | 1.00 |  |  |  |  |
| Barcol hardness |  | 56 |  | 57 |  | 56 |  |  |  |  |
| Shelf life of SMC pastes, time to harden days: at 100° F | 10–13 | 1–2 | 1–2 | 3–5 | 2–3 | 18–20 | 1–2 | 2 | 26 | >3>6 |

* 0.012 parts metal added
** Includes addition of 108 parts by weight of ¼" fiberglass chopped strands The results in Table II show that the cure time, and hardness for the cobaltic promoted SMC pastes in Samples 6 and 9 compared favorably to the cure time and hardness of resins promoted with the cobaltous promoters (see Samples 2 and 4).

On the other hand, there was an incredible difference between the shelf life of SMC pastes promoted with cobaltic promoter and thickened with MgO and Mg (OH$_2$) (Samples 6 and 9) as compared to a nonthickened cobaltic promoted resin (Sample 8) and the cobaltous promoted resins i.e., Samples 2, 3, 4, and 5 and the cobaltous-acetylacetone promoted resin (Sample 7).

Sample 4 appeared to be equivalent of the cobaltic promoted resins in Example 1 but certainly in terms of shelf life, there is no equivalence. The shelf life is from 8–10 times longer than any of the other promoted or nonpromoted resins and even longer when the resin is promoted with cobaltic acetylacetone and thickened with MgO as opposed to other chemical thickeners e.g., Mg(OH)$_2$.

What is claimed is:

1. In a process for preparing a molding compound comprising mixing an unsaturated polyester resin with an unsaturated monomer, soluble and copolymerizable therewith, and chemically thickening with a Group II metal oxide or hydroxide, the improvement for extending the shelf life while providing enhanced cure rate at the molding temperature for said molding compound which comprises:
    incorporating at least an effective proportion of a cobaltic promoter having a valence of 3 and soluble in said molding compound for selectively extending the shelf life and enhancing the cure rate of said molding compound.

2. The process of claim 1 wherein said molding compound contains a catalyst.

3. The process of claim 2 wherein said catalyst is selected from the group consisting of a perester, a peroxide, and a hydroperoxide.

4. The process of claim 3 wherein said catalyst is included in said molding compound in a proportion of from about 0.25 to 2 parts by weight of the unsaturated polyester resin and unsaturated monomer.

5. The process of claim 4 wherein said cobaltic promoter is incorporated in said molding compound in a proportion for providing 0.006 to 0.036 parts cobalt metal per 100 parts unsaturated polyester resin and unsaturated monomer.

6. The process of claim 5 wherein said chemical thickener is included in said molding compound in a proportion of 0.5 to 25 parts per 100 parts unsaturated polyester resin and unsaturated monomer.

7. The process of claim 6 wherein said cobaltic promotor is selected from the group consisting of cobaltic halides, cobaltic monocarboxylic acids having from 2 to 20 carbon atoms in the structure and cobaltic sulfate.

8. The process of claim 6 wherein said cobaltic promoter is a cobaltic beta-diketone.

9. The process of claim 7 wherein said cobaltic beta-diketone is selected from the group consisting of cobaltic acetylacetonate and cobaltic acetonylacetonate.

10. The process of claim 9 wherein said chemical thickener is a magnesium compound selected from the group consisting of magnesium oxide and magnesium hydroxide.

11. The process of claim 10 wherein said molding compound includes a thermoplastic polymer suited for imparting low shrink characteristics to said molding compounds.

12. The process of claim 11 wherein said promoter is cobaltic acetyl acetonate and said catalyst is t-butyl perbenzoate.

13. In a thermosettable molding compound comprising an unsaturated polyester resin and an unsaturated monomer soluble in an copolymerizable therewith, said molding compound chemically thickened with a Group II metal oxide or hydroxide, the improvement for imparting extended shelf life to said molding compound and for providing desired cure rate which comprises: an effective proportion of a cobaltic promoter having a valence of 3 substantially uniformly dispersed in said molding compound for extending the shelf life of said molding compound and enhancing said cure rate.

14. The molding compound of claim 13 wherein said molding compound contains a catalyst.

15. The molding compound of claim 14 wherein said catalyst is selected from the group consisting of a perester, a peroxide, and a hydroperoxide.

16. The molding compound of claim 15 wherein said catalyst is included in said molding compound in a proportion of from about 0.25 to 2 parts by weight of the unsaturated polyester resin and unsaturated monomer.

17. The molding compound of claim 16 wherein said cobaltic promoter is incorporated in said molding compound in a proportion for providing 0.006 to 0.036 parts cobalt metal per 100 parts unsaturated polyester resin and unsaturated monomer.

18. The molding compound of claim 17 wherein said chemical thickener is included in said molding compound in a proportion of from 0.5 to 25 parts per 100 parts unsaturated polyester resin and unsaturated monomer.

19. The molding compound of claim 18 wherein said cobaltic promoter is selected from the group consisting of cobaltic halides, cobaltic monocarboxylic acids having from 220 carbon atoms in the structure and cobaltic sulfate.

20. The molding compound of claim 19 wherein said cobaltic promoter is a cobaltic beta-diketone.

21. The molding compound of claim 20 wherein said cobaltic beta-diketone is selected from the group consisting of cobaltic acetyl acetonate and cobaltic acetonyl acetonate.

22. The molding compound of claim 21 wherein said chemical thickener is a magnesium compound selected from the group consisting of magnesium oxide and magnesium hydroxide.

23. The molding compound of claim 22 wherein said molding compound includes a thermoplastic polomer suited for imparting low shrink characteristics to said molding compound.

24. The molding compound of claim 23 wherein said promoter is cobaltic acetyl acetonate and said catalyst is t-butylperbenzoate.

\* \* \* \* \*